(12) United States Patent
Minakuchi

(10) Patent No.: US 9,591,198 B2
(45) Date of Patent: Mar. 7, 2017

(54) ENDOSCOPE FOR OUTPUTTING SIGNAL

(71) Applicant: HOYA CORPORATION, Tokyo (JP)

(72) Inventor: Tadashi Minakuchi, Saitama (JP)

(73) Assignee: HOYA CORPORATION, Tokyo (JP)

( * ) Notice: Subject to any disclaimer, the term of this patent is extended or adjusted under 35 U.S.C. 154(b) by 601 days.

(21) Appl. No.: 14/088,866

(22) Filed: Nov. 25, 2013

(65) Prior Publication Data

US 2014/0176691 A1    Jun. 26, 2014

(30) Foreign Application Priority Data

Dec. 25, 2012  (JP) ................................ 2012-281472

(51) Int. Cl.

| H04N 7/18 | (2006.01) |
|---|---|
| A62B 1/04 | (2006.01) |
| H04N 9/47 | (2006.01) |
| H04N 5/232 | (2006.01) |
| H04N 5/225 | (2006.01) |
| H04N 9/04 | (2006.01) |

(52) U.S. Cl.
CPC ......... *H04N 5/23203* (2013.01); *H04N 7/183* (2013.01); *H04N 9/045* (2013.01); *H04N 2005/2255* (2013.01)

(58) Field of Classification Search
None
See application file for complete search history.

(56) References Cited

U.S. PATENT DOCUMENTS

| 5,974,464 A | 10/1999 | Shin et al. |
|---|---|---|
| 2005/0046744 A1 | 3/2005 | Ohkubo et al. |
| 2005/0179782 A1* | 8/2005 | Endo .................. H04N 5/23203 348/207.99 |
| 2008/0136903 A1* | 6/2008 | Takada .................. H04N 7/183 348/65 |

(Continued)

FOREIGN PATENT DOCUMENTS

| EP | 2096865 | 9/2009 |
|---|---|---|
| EP | 2575352 | 4/2013 |

(Continued)

OTHER PUBLICATIONS

European Search Report in European Patent Application No. 13196472.8, dated Nov. 5, 2015.

(Continued)

*Primary Examiner* — Frederick Bailey
*Assistant Examiner* — Talha M Nawaz
(74) *Attorney, Agent, or Firm* — Greenblum & Bernstein, P.L.C.

(57) ABSTRACT

An endoscope is provided having an imager, an analog-digital converter, and a data converter. The imager comprises multiple pixels which output pixel signals, and that outputs an image signal comprising the pixel signals. The analog-digital converter converts the image signal to digital image data in parallel data format. The data converter converts the digital image data to transmission data. The data converter converts the pixel-generated digital image data based on a first rule, converts the converted digital image data to converted pixel data in serial data format, and adds a start bit and an end bit to the converted pixel data to convert the digital image data to the transmission data.

5 Claims, 3 Drawing Sheets

(56) References Cited

U.S. PATENT DOCUMENTS

| | | | | |
|---|---|---|---|---|
| 2009/0213212 A1* | 8/2009 | Nakamura | ............ | A61B 1/042 348/65 |
| 2011/0298908 A1* | 12/2011 | Murakami | ......... | A61B 1/00009 348/65 |
| 2012/0320176 A1* | 12/2012 | Tanaka | ................ | A61B 1/04 348/65 |
| 2013/0083178 A1* | 4/2013 | Kotani | ................ | A61B 1/05 348/65 |

FOREIGN PATENT DOCUMENTS

| | | |
|---|---|---|
| JP | H02-001943 | 1/1990 |
| JP | H06-111494 | 4/1994 |
| JP | 2001-127744 | 5/2001 |
| JP | 2005-004310 | 1/2005 |
| JP | 2006-135768 | 5/2006 |
| JP | 2007-150396 | 6/2007 |
| JP | 2008-301965 | 12/2008 |
| JP | 2009-201540 | 9/2009 |
| JP | 4757019 | 8/2011 |
| JP | 2013-075100 | 4/2013 |
| JP | 2013-078377 | 5/2013 |
| JP | 2013-078378 | 5/2013 |
| WO | 97/13348 | 4/1997 |

OTHER PUBLICATIONS

Office Action issued in Japan Counterpart Patent Appl. No. 2012-281472, dated Dec. 6, 2016, along with an english translation thereof.

* cited by examiner

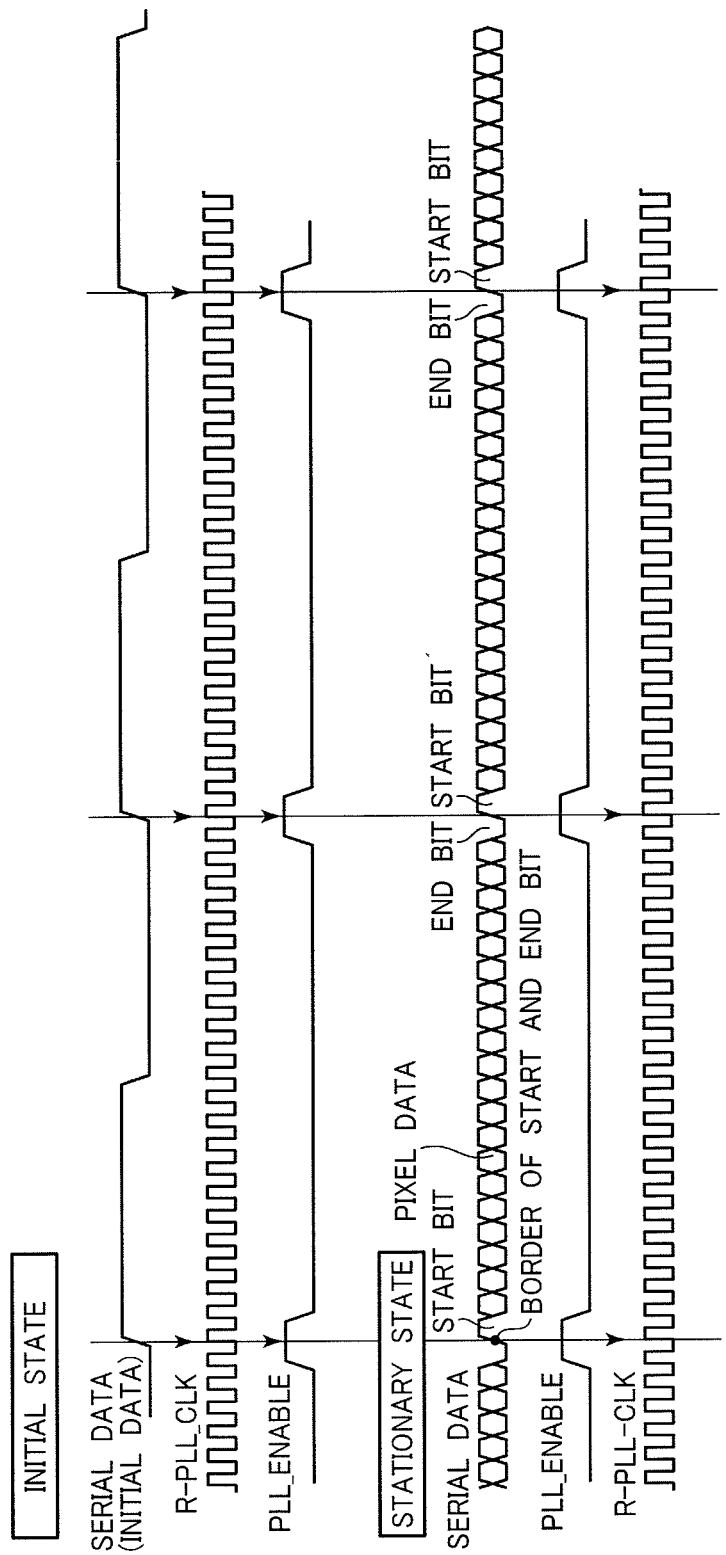

ENDOSCOPE FOR OUTPUTTING SIGNAL

BACKGROUND OF THE INVENTION

Field of the Invention

The present invention relates to an endoscope comprising an imager.

SUMMARY OF THE INVENTION

An object of the present invention is to provide an endoscope that comprises a small distal end.

According to the present invention, an endoscope is provided that comprises an imager, an analog-digital converter, and a data converter. The imager comprises multiple pixels which output pixel signals, and that outputs an image signal comprising the pixel signals. The analog-digital converter converts the image signal to digital image data in parallel data format. The data converter converts the digital image data to transmission data. The data converter converts the pixel-generated digital image data based on a first rule, converts the converted digital image data to converted pixel data in serial data format, and adds a start bit and an end bit to the converted pixel data to convert the digital image data to the transmission data.

BRIEF DESCRIPTION OF THE DRAWINGS

The objects and advantages of the present invention will be better understood from the following description, with reference to the accompanying drawings in which:

FIG. 3 shows a procedure used to receive the transmission data.

DESCRIPTION OF THE PREFERRED EMBODIMENTS

Figure 1:
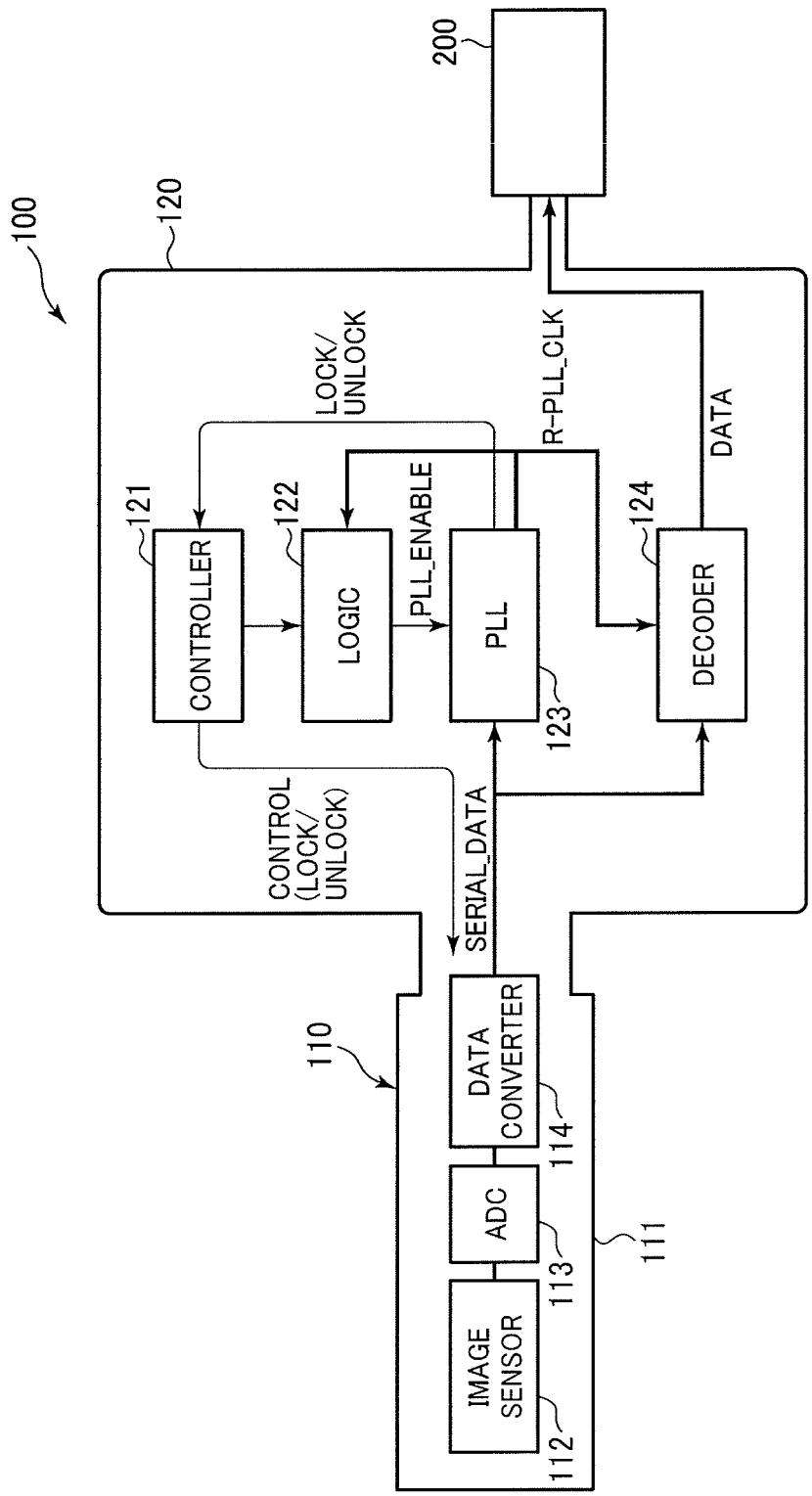
FIG. 1 is a block diagram showing the endoscope as an embodiment of the present invention.

The present invention is described below with reference to the embodiments shown in the drawings. The constructions of an endoscope 100 are described hereinafter with reference to FIGS. 1 and 2.

The endoscope 100, which is used with a processor 200, mainly comprises an insertion part 110 that is inserted into a human body, an operating part (not shown) that is operated by a user, and a connector 120 that is connected to the processor 200.

A CMOS imager 112, an ADC 113, and a data converter 114 are configured in a distal end 111 of the insertion part 110.

The CMOS 112 has multiple pixels that correspond to a plurality of colors. Each individual pixel has one color. Multiple pixels are aligned in a matrix of n rows and m columns; n and mare integers. Each pixel outputs an analog pixel signal according to an electric charge that is stored in each pixel when the CMOS 112 photographs a subject. The analog pixel signal is output in the order of alignment of the pixels in the CMOS 112 with one horizontal synchronization signal output for each row. That is, an picture signal comprises multiple analog pixel signals that correspond to a plurality of colors, and multiple analog pixel signals are output in a certain order so that the CMOS 112 outputs an image signal. The image signal comprises analog pixel signals.

The ADC 113 converts the picture signal to digital image data. The data converter 114 converts the digital image data to serial transmission data using a procedure described hereinafter, and sends the serial transmission data to the connector 120.

The connector 120 is equipped with a controller 121, a logic circuit 122, a PLL 123, and decoder 124. A receiver receives the serial transmission data from the data converter, and decodes it to obtain image data. The details of these components and their functions and operating procedures are described hereinafter.

The procedure that converts the digital image data to the serial transmission data is described with reference to FIGS. 1 and 2.

Figure 2:
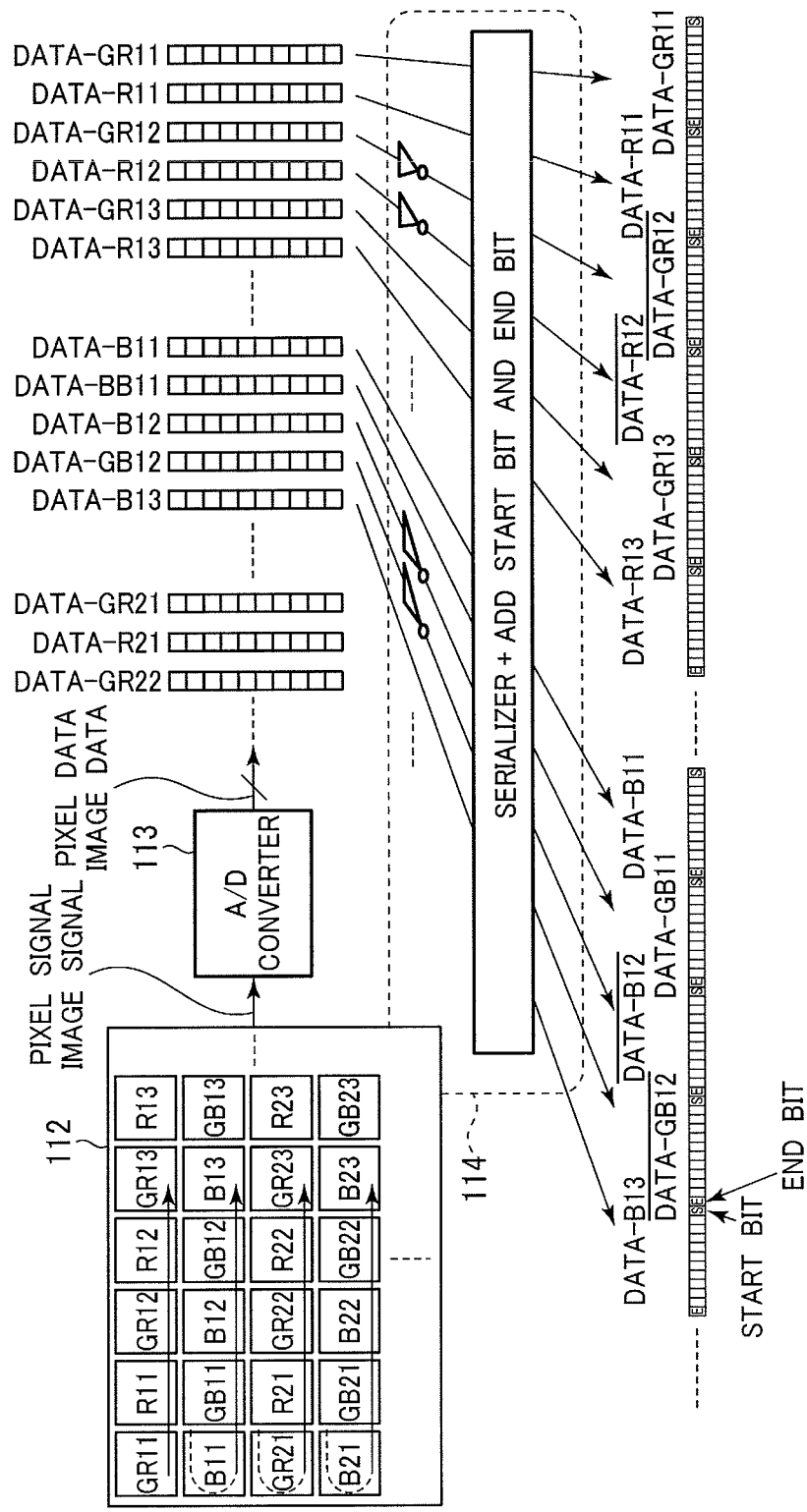
FIG. 2 shows a procedure used to convert image data to transmission data.

The CMOS 112 has a checkered pattern alignment as illustrated by FIG. 2. The green pixels and the red pixels are aligned alternately in the first line at the top of FIG. 2, such as the green pixel (Gr11), the red pixel (R11), the green pixel (Gr12), the red pixel (R12), etc., from left to right. In the second line from the top, the blue pixels and the green pixels are aligned alternately, such as the blue pixel (B11), the green pixel (Gb11), the blue pixel (B12), the green pixel (Gb12), etc., from left to right. In the third line from the top, the green pixels and the red pixels are aligned alternately from left to right, same as in the first line. In the fourth line from the top, the blue pixels and the green pixels are aligned alternately from left to right, same as in the second line. In the line below the fourth line, colored pixels are aligned iteratively such that the alignment of the first line and the alignment of the second line are aligned alternately.

The CMOS 112 outputs the analog pixel signals that correspond to electric charges of pixels from the upper-left pixel toward the right. The pixel at the right end of the first line outputs its analog pixel signal, and then the pixels in the second line output their analog pixel signals from left to right. The output is repeated in all of the lines of the CMOS 112 from the top line to the bottom. That is, the analog pixel signals are output in the order corresponding to the green pixel (Gr11), the red pixel (R11), the green pixel (Gr12), the red pixel (R12), . . . , the blue pixel (B11), the green pixel (Gb11), the blue pixel (B12), the green pixel (Gb12), . . . , the green pixel (Gr21), the red pixel (R21), the green pixel (Gr22), the red pixel (R22), . . . , the blue pixel (B21), the green pixel (Gb21), the blue pixel (B22), and the green pixel (Gb22).

The ADC 113 converts the analog pixel signals to digital signals, e.g. 10-bit signals. The 10-bit digital signals are identified as digital pixel data or simply pixel data. The analog pixel signal output by the pixel Gr11 is converted to the 10-bit digital pixel data labeled Data-Gr11 in FIG. 2. The analog pixel signal output by the pixel R11 is converted to the 10-bit digital pixel data labeled Data-R11 in FIG. 2. Similarly the analog pixel signal output by the pixel Gr12 is converted to the 10-bit digital pixel data labeled Data-Gr12. Likewise, the analog pixel signal output by the pixel R12 is converted to the 10-bit digital pixel data labeled Data-R12.

The data converter 114 inverts the values of the digital pixel data according to the first rule. The first rule alternately inverts the digital image data that are output by the multiple pixels of the same color so that they are aligned in the predetermined direction. The alternate inversion is a NOT operation for each bit. The predetermined direction is the horizontal direction. For example, in the case that the first rule is applied to the first line, the Data-Gr11 are not inverted, but the Data-Gr12 that are output by the next Green pixel are inverted. Further, the Data-Gr13 are not inverted. As for the red pixels, the Data-R11 and Data-R13 are not inverted, but the Data-R12 are inverted. The second line is processed in a similar manner. A group of output data that has been processed by the data converter is called converted pixel data. Rewording the first rule, it inverts the digital pixel data that are output by the even-numbered pixels from the left end of the row in the horizontal direction (read-out direction), or it inverts the digital pixel data of every other pixel that are output by the same color pixel in the horizontal direction (read-out direction).

Further, the data converter 114 adds a start bit to the head of the converted pixel data and adds an end bit to the tail of the converted pixel data, so that the data converter converts the digital pixel data to a serial data format. Describing in detail, the data converter 114 inserts a start bit preceding the converted pixel data and an end bit trailing the converted pixel data, and aligns the data in the order of output from the CMOS 112 so as to create the transmission serial data. Therefore, the data length of one unit of the transmission serial data is a total of 12 bits that includes a one-bit start bit, 10 bits of the inverted or non-inverted pixel data, and a one-bit end bit. The end bit is created by inverting the start bit. The data length of the start bit and the end bit is one bit. For examples, the value of the start bit is "1" and the value of the end bit is "0". Note that the synchronization signal, e.g. the horizontal synchronization signal, is also converted to a digital signal that has the same number of bit units as the pixel data. The processing order of the first rule and the serialization of the parallel pixel data may be reversed. In either case, the effect is the same.

The procedure for receiving the serial transmission data is described with reference to FIGS. 1 and 3. Before sending the serial transmission data the endoscope 100 changes its operational state to an initial state, in which it prepares to receive the serial transmission, then shifts to a stationary state and receives the transmission serial data.

The initial state is described below. In the initial state the data converter 114 sends initial data to the PLL 123 and the connector 120 that includes the decoder 124. The initial data preferably comprises a signal wherein its cycle (data length) is equal to a data length of one data unit that includes the start bit, the end bit, and the converted pixel data, and its duty ratio is 50%.

In the initial state, the PLL 123 synchronizes the initial data that is sent by the data converter, and creates a receiver-synchronizing signal (R-PLL-CLK) that has a predetermined magnification ratio. The predetermined magnification ratio is correlated to the data length of the converted pixel data that includes the start and end bits. Therefore, in the case that the data length of the converted pixel data is 10 bits, the total length of data units is 12 bits, and the predetermined magnification ratio is 12 times. The logic circuit 122 creates a PLL-Enable signal from the R-PLL-CLK. The PLL-Enable signal masks the rising edge of the initial data. In the case that the PLL-Enable signal is created and the PLL 123 continues to lock the initial data, the controller 121 sends a locking indicator message to the transmitter (the data converter 114) and the endoscope 100 shifts from the initial state to the stationary state.

The operation of the endoscope 100 in the stationary state is described below. The data converter that receives the locking indicator message stops sending the initial data and starts sending the serial transmission data when the phase of a border (rising edge) between the start bit and the end bit synchronizes with the phase of the rising edge of the initial data. The PLL 123 detects only the border between the start bit and the end bit in the serial transmission data according to the PLL-Enable signal. Therefore, the PLL 123 can correct the cycle and phase of the R-PLL-CLK according to the timing of detection of the border, and continuously outputs the R-PLL-CLK that synchronizes the serial transmission data.

The decoder 124 decodes (demodulates) the serial transmission data (serial signal) that is sent from the data converter 114 with reference to the R-PLL-CLK and the PLL-Enable signal from the PLL 123. That is, it extracts the synchronization signal and the converted pixel data from the serial transmission data. The decoder 124 detects the horizontal synchronization signal that is extracted from the serial transmission data by detecting the converted pixel data, which has been inverted by the data converter 114, in the serial transmission data. Then, the decoder 124 inverts the converted pixel data according to the first rule so that the digital pixel data is created. Therefore, the received image data, which was sent by the data converter 114, is reproduced. Additionally, the decoder 124 converts the pixel data of a signal in serial data format to a digital pixel signal in parallel data format, and outputs it to the processor 200 with a synchronized clock reference signal.

In the case that the PLL 123 cannot lock the serial transmission data, it sends an unlocked signal to the controller 121. The controller 121, which receives the unlock signal, sends the unlock signal to the data converter 114. When the endoscope 100 receives the unlock signal it shifts to the initial state to lock the serial transmission data.

According to the embodiment, the digital pixel data is inverted by the inverting circuit (the data converter 114) without a modulation method that uses a particular conversion table, so that modulation is accomplished by use of only an inverting circuit. Additionally, the serial transmission data is created by using only a process that adds the start and end bits to the digital pixel data. Such calculation utilizes relatively low calculation power, so that the endoscope can use a small IC. Therefore, the circuit for the calculation can be small. Thereby, by minimizing the size of the circuit in the distal end 111, the size of the distal end 111 can also be reduced.

The pixel signals of adjacent same-colored pixels correlate with each other, so that DC balance characteristics are improved by alternately inverting the value of the adjacent pixel data without increasing the speed of the transmission bit rate. As the DC balance characteristic is improved, so is the ease of making the AC coupling.

In a photographed image, the value of the analog pixel signals output by the adjacent same-colored pixels may have a tendency to inter-correlate with each other, e.g., they may have an approximate value. When the approximate value is converted to digital pixel data, the same values are repetitive; so that average of them may frequently change (DC balance gets worse). When this occurs and the pixel data is sent to the receiver with AC coupling, the DC component is not transmitted, so that the receiver may not receive an accurate signal. In the instant embodiment, however, the values of the digital pixel data of the adjacent same-colored pixels are alternately inverted when the signal is created, and the average of the signal corresponds to substantially intermediate values of a dynamic range of an image photographed by the endoscope 100. Therefore, in the case where the same value is successive, the average does not frequently change and the receiver can receive the signal with accuracy in the AC coupling channel.

The data length of the serial transmission serial data can be reduced because the data length of the start and end bits is one bit. The 8B10B modulating method increases the data rate by 25%, however, the instant embodiment increases the data rate by only 20% because 10 bits of actual data is sent within 12 total bits of data.

The PLL 123 can lock the serial transmission serial data according to the start and end bits.

Note that the data length of the digital pixel data need not be limited to 10 bits. The data length of the initial data may vary according to the data length of one unit of the digital pixel data.

The imager need not be limited to the CMOS 112, and may be a CCD.

Note that the converted pixel data, which is included in one unit of the serial transmission data, need not be limited to data from one pixel, and may instead be pixel data generated by one or more pixels. In the case that the converted pixel data in one unit of the serial transmission data is from two pixels, the data length of one unit in the serial transmission data is 22 bits. The incremental data rate is 10% in this case, which is less than the 25% increment in the data rate of the 8B10B modulating method. Accordingly, the data length of the initial data is modified according to the data length of one unit of the serial transmission data.

Note that the controller 121, the logic circuit 122, the PLL 123, and the decoder 124 may be provided in the processor 200. The processor 200 receives the serial transmission data from the endoscope 100 and creates the received image data.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2012-281472 (filed on Dec. 25, 2012), which is expressly incorporated herein, by reference, in its entirety.

The invention claimed is:

1. An endoscope comprising:
    an imager that comprises multiple pixels which output pixel signals, and that outputs an image signal comprising the pixel signals;
    an analog-digital converter that converts the image signal to digital image data in parallel data format;
    a data converter that converts the digital image data to transmission data; and
    the data converter converting the pixel-generated digital image data based on a first rule, converting the converted digital image data to converted pixel data in serial data format, and adding a start bit and an end bit to the converted pixel data to convert the digital image data to the transmission data,
    wherein the multiple pixels correspond to multiple colors; one pixel corresponds to one color; the multiple pixels are aligned in a predetermined direction in the imager; the first rule alternately inverts the digital image data that are output by the multiple pixels of the same colors that are aligned in the predetermined direction.

2. The endoscope according to claim 1, wherein the length of the start bit and the end bit is one bit.

3. The endoscope according to claim 1, further comprising a receiver that receives the transmission data from the data converter,
    wherein the data converter sends initial data to the receiver before the data converter sends the transmission data to the receiver, the initial data comprises a cycle length that is equal to a data length of the transmission data that includes the start bit and the end bit,
    the receiver creates a receiver-synchronization signal based on the received initial data,
    the data converter stops sending the initial data and starts sending the transmission data when a phase of a border between the start bit and the end bit of the transmission data synchronizes with a phase of a rising or falling edge of the initial data after the receiver creates the receiver-synchronizing signal.

4. The endo scope according to claim 3, wherein the receiver adjusts a phase and cycle of the receiver-synchronizing signal based on the border between the start bit and the end bit of the transmission data and continuously outputs the receiver-synchronizing signal, which synchronizes the transmission data, after the data converter stops sending the initial data and starts sending the transmission data.

5. The endoscope according to claim 4, wherein the receiver decodes the received transmission data to obtain original image data based on the receiver-synchronizing signal.

* * * * *